(12) United States Patent
Teranaka (10) Patent No.: US 11,590,665 B2
(45) Date of Patent: Feb. 28, 2023

(54) ROBOT

(71) Applicant: Seiko Epson Corporation, Tokyo (JP)

(72) Inventor: Ryosuke Teranaka, Matsumoto (JP)

(73) Assignee: SEIKO EPSON CORPORATION

(*) Notice: Subject to any disclaimer, the term of this patent is extended or adjusted under 35 U.S.C. 154(b) by 368 days.

(21) Appl. No.: 16/830,439

(22) Filed: Mar. 26, 2020

(65) Prior Publication Data

US 2020/0306987 A1 Oct. 1, 2020

(30) Foreign Application Priority Data

Mar. 27, 2019 (JP) .............................. JP2019-060002

(51) Int. Cl.
| | |
|---|---|
| B25J 9/10 | (2006.01) |
| B25J 13/08 | (2006.01) |
| B25J 9/16 | (2006.01) |
| B25J 13/06 | (2006.01) |

(52) U.S. Cl.
CPC ............. B25J 13/085 (2013.01); B25J 9/104 (2013.01); B25J 9/1674 (2013.01); B25J 9/1697 (2013.01); B25J 13/06 (2013.01)

(58) Field of Classification Search
CPC ........ B25J 13/085; B25J 9/104; B25J 9/1674; B25J 9/1697; B25J 13/06; B25J 9/161; B25J 9/0081; B25J 9/12; B25J 9/1656; B25J 9/1679; B25J 15/0052; B25J 18/00
USPC ................ 700/245–264; 318/568.11–568.25; 74/490.1
See application file for complete search history.

(56) References Cited

U.S. PATENT DOCUMENTS

| | | | | |
|---|---|---|---|---|
| 6,590,633 B1 * | 7/2003 | Nishi | ................... | G03F 7/70991 269/21 |
| 7,343,223 B2 * | 3/2008 | Miura | ....................... | G01L 1/26 901/34 |
| 9,043,016 B2 * | 5/2015 | Filippov | ............... | G05B 19/414 700/245 |
| 9,114,530 B2 * | 8/2015 | Tsusaka | ............... | G05B 19/423 |
| 9,119,655 B2 * | 9/2015 | Bowling | ................ | A61B 34/10 |
| 9,492,925 B2 * | 11/2016 | Aiso | ...................... | B25J 9/1633 |
| 9,713,247 B2 * | 7/2017 | Iida | ....................... | H05K 1/0216 |
| 10,189,164 B2 * | 1/2019 | Motoyoshi | ............ | B25J 13/088 |
| 10,350,437 B2 * | 7/2019 | Fishman | ............. | A61N 5/1083 |
| 2002/0171815 A1 * | 11/2002 | Matsuyama | ........ | G03F 7/70308 356/399 |
| 2004/0027032 A1 * | 2/2004 | Moteki | ................... | H02N 2/006 310/323.02 |

(Continued)

FOREIGN PATENT DOCUMENTS

| | | |
|---|---|---|
| JP | 2006-021287 A | 1/2006 |
| JP | 2012-013537 A | 1/2012 |

(Continued)

Primary Examiner — Jaime Figueroa
(74) Attorney, Agent, or Firm — Harness, Dickey & Pierce, P.L.C.

(57) ABSTRACT

A robot includes a base, a movable unit coupled to the base, and a control board having an imaging calculation unit that calculates output from an imaging unit, a force calculation unit that calculates output from a first force detection unit, and an action calculation unit that calculates an action of the movable unit based on a calculation result by the imaging calculation unit and a calculation result by the force calculation unit, wherein the control board is located inside of the base.

10 Claims, 4 Drawing Sheets

(56) References Cited

U.S. PATENT DOCUMENTS

| | | | |
|---|---|---|---|
| 2004/0181312 A1* | 9/2004 | Miura | B25J 13/085 700/258 |
| 2012/0259464 A1 | 10/2012 | Morioka et al. | |
| 2013/0041219 A1* | 2/2013 | Hasegawa | A61B 17/29 600/109 |
| 2013/0090880 A1 | 4/2013 | Sato | |
| 2013/0310977 A1* | 11/2013 | Tsusaka | B25J 9/1656 700/257 |
| 2014/0039681 A1* | 2/2014 | Bowling | A61B 34/37 700/261 |
| 2014/0097251 A1* | 4/2014 | Joussen | G06K 7/1491 235/462.07 |
| 2015/0093376 A1 | 4/2015 | Herting et al. | |
| 2015/0105907 A1* | 4/2015 | Aiso | B25J 9/1633 901/47 |
| 2015/0364060 A1* | 12/2015 | Gupta | A63H 3/28 434/118 |
| 2015/0374446 A1* | 12/2015 | Malackowski | A61B 34/10 606/130 |
| 2016/0120020 A1* | 4/2016 | Iida | H05K 1/025 361/749 |
| 2016/0120021 A1* | 4/2016 | Iida | B25J 19/0029 361/749 |
| 2017/0080577 A1* | 3/2017 | Motoyoshi | B25J 9/0018 |
| 2018/0093376 A1 | 4/2018 | Teranaka | |
| 2019/0060674 A1* | 2/2019 | Fishman | A61N 5/1048 |
| 2020/0038691 A1* | 2/2020 | Fishman | A61B 6/542 |

FOREIGN PATENT DOCUMENTS

| | | |
|---|---|---|
| JP | 2012-218094 A | 11/2012 |
| JP | 2013-125455 A | 6/2013 |
| JP | 2015-112654 A | 6/2015 |
| JP | 2015-182142 A | 10/2015 |
| JP | 2017-087366 A | 5/2017 |
| JP | 2018-051708 A | 4/2018 |

* cited by examiner

| | PROCESSOR CORE 70 | PROCESSOR CORE 71 | PROCESSOR CORE 72 | PROCESSOR CORE 73 |
|---|---|---|---|---|
| CALCULATION UNIT | HIGH-ORDER CALCULATION UNIT 700 | IMAGING CALCULATION UNIT 710 | | FORCE CALCULATION UNIT 731<br>ACTION CALCULATION UNIT 732 |
| OS | Linux (UNIVERSAL OS) | | | BEAR METAL HYPERVISOR (REAL-TIME OS) |
| FIRMWARE/ APPLICATION | FIRMWARE FOR CONTROL BOARD | APPLICATION FOR IMAGING | | APPLICATION FOR FORCE DETECTION<br>APPLICATION FOR ACTION CALCULATION |

ROBOT

The present application is based on, and claims priority from JP Application Serial Number 2019-060002, filed Mar. 27, 2019, the disclosure of which is hereby incorporated by reference herein in its entirety.

BACKGROUND

1. Technical Field

The present disclosure relates to a robot.

2. Related Art

For example, a robot includes a robot arm with an end effector such as a hand attached to a distal end thereof. When the end effector performs work, it is necessary to control the end effector in various postures, and the robot arm has a plurality of arms and the respective arms are configured to pivot. Further, drive devices including motors that generate drive power for pivoting the arms and encoders that detect pivot states are provided in pivot shafts of the respective arms.

For integrated control of the plurality of drive devices, a robot controller is used. The robot controller is coupled to the respective drive devices via wiring and controls driving of the respective drive devices so that the end effector may take a target posture.

These days, various sensors are attached to the robot and driving of the respective drive devices are controlled based on detection results of the sensors.

For example, JP-A-2012-13537 discloses a robot system having an articulated arm, a force sensor provided in a distal end of the arm, a hand as an end effector attached to the distal end of the arm via the force sensor, and a camera that can image the hand.

The robot system further has a robot control apparatus that supply a current to a motor provided in each robot to actuate the robot, a force measuring apparatus that calculates a measurement value indicating a force or moment based on a detection signal output from the force sensor, a vision measuring apparatus that processes an image transmitted from the camera and performs a calculation necessary for position correction of the robot, and a controller that performs integrated control of the entire system. Further, the controller controls the entire system based on calculation results obtained from the force measuring apparatus and the vision measuring apparatus.

However, in the robot system described in JP-A-2012-13537, the robot control apparatus, the force measuring apparatus and vision measuring apparatus, and the controller are respectively individually provided and, further, a plurality of cables are necessary for coupling the apparatuses and the controller. Accordingly, there is a problem that installation of the robot system is not easy because securement of a space for placement of the respective apparatuses and the controller and laying of the cables take a lot of time and effort.

SUMMARY

A robot according to an application example of the present disclosure includes a base, a movable unit coupled to the base, and a control board having an imaging calculation unit that calculates output from an imaging unit, a force calculation unit that calculates output from a first force detection unit, and an action calculation unit that calculates an action of the movable unit based on a calculation result by the imaging calculation unit and a calculation result by the force calculation unit, wherein the control board is located inside of the base.

DESCRIPTION OF EXEMPLARY EMBODIMENTS

As below, a preferred embodiment of a robot according to the present disclosure will be explained in detail with reference to the accompanying drawings.

Figure 1:
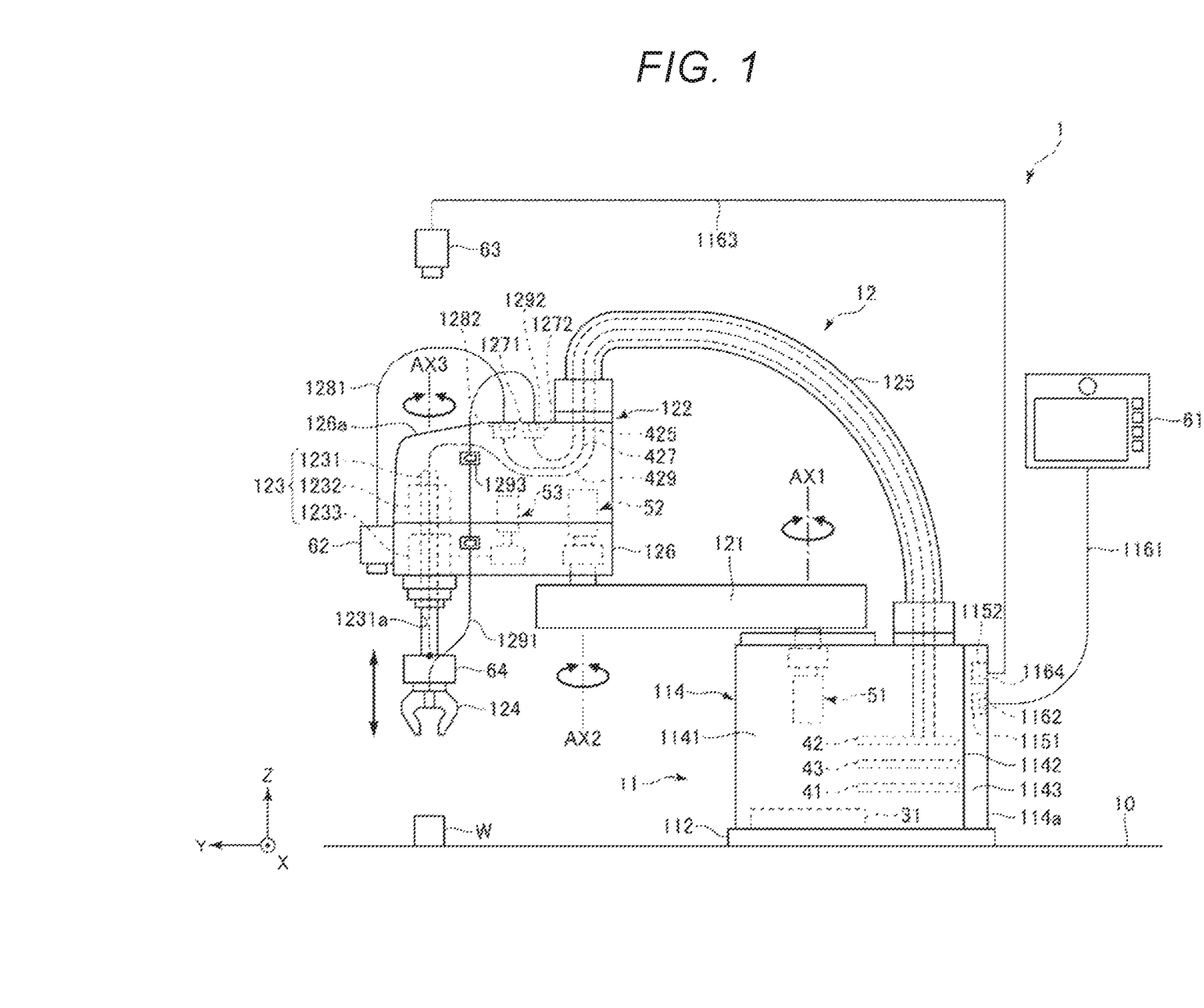
FIG. 1 is a side view showing a robot according to an embodiment.
Figure 2:
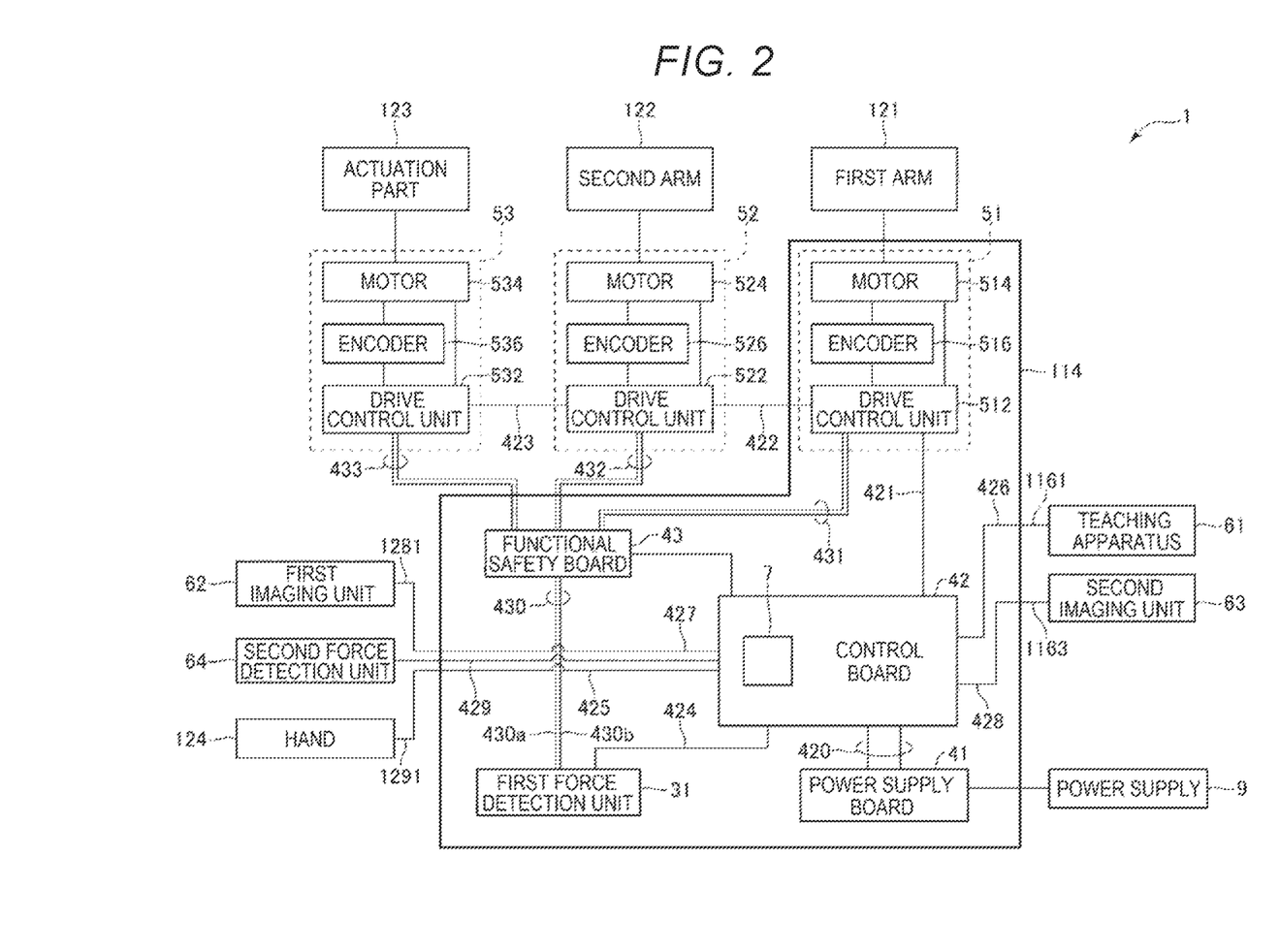
FIG. 2 is a functional block diagram of the robot shown in FIG. 1.
Figure 3:
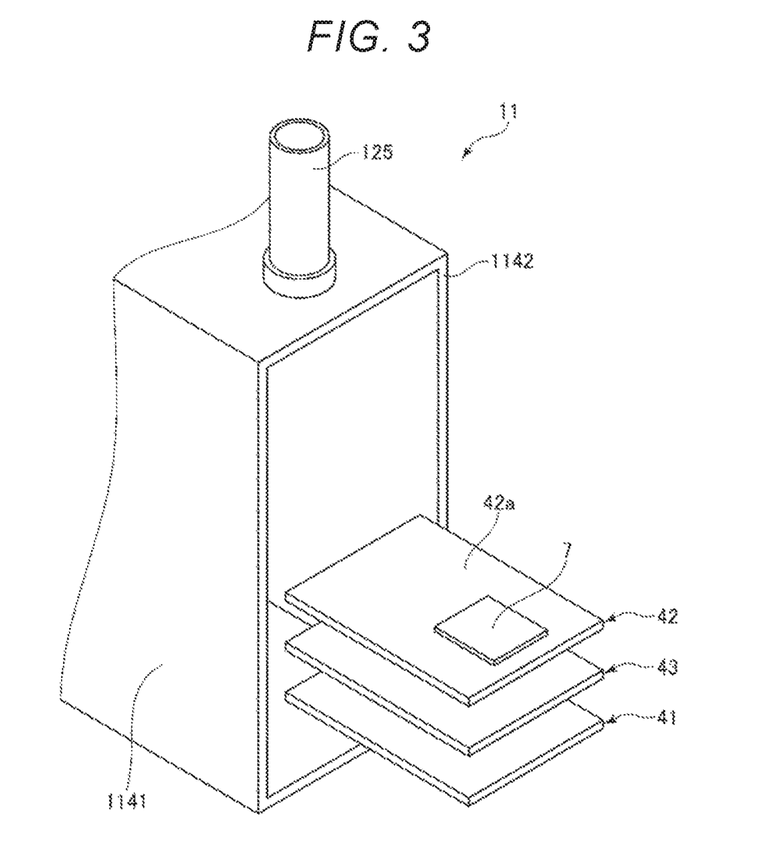
FIG. 3 is an exploded perspective view of a base of the robot shown in FIG. 1.

FIG. 1 is the side view showing the robot according to the embodiment. FIG. 2 is the functional block diagram of the robot shown in FIG. 1. FIG. 3 is the exploded perspective view of the base of the robot shown in FIG. 1.

The robot shown in FIG. 1 is the so-called horizontal articulated robot. The application of the robot 1 is not particularly limited to, but includes e.g. feed, removal, transport, and assembly of objects W such as precise apparatuses and components forming the apparatuses.

The robot 1 shown in FIG. 1 includes a base 11 and a movable unit 12 coupled to the base 11.

The base 11 is fixed to a placement surface 10 of e.g. a floor, wall, ceiling, table, movable platform, or the like. In the following description, for convenience of explanation, the upside in FIG. 1 is referred to as "upper" and the downside is referred to as "lower". In FIGS. 1 and 3, two axes orthogonal to each other within the plane of the placement surface 10 are referred to as "X-axis" and "Y-axis". An axis orthogonal to both the X-axis and the Y-axis is referred to as "Z-axis".

The movable unit 12 has a first arm 121, a second arm 122, an actuation part 123, a hand 124, and a pipe 125. The number of these elements contained in the movable unit is not particularly limited, but may be an arbitrary number. The first arm 121 is pivotably provided relative to the base 11. The second arm 122 is pivotably provided relative to the first arm 121. The actuation part 123 is linearly movably and pivotably provided relative to the second arm 122. Note that the configuration of the actuation part 123 is not limited to that. The part may be linearly movable, but not pivotable, or may be pivotable, but not linearly movable.

The robot 1 shown in FIG. 1 has a first force detection unit 31 provided inside of the base 11, a teaching apparatus 61 placed outside, a first imaging unit 62 attached to the movable unit 12, a second imaging unit 63 placed outside, and a second force detection unit 64 attached to the movable unit 12. Note that these may be respectively provided as necessary or omitted.

As below, the respective units of the robot 1 will be explained.

1. Base

The base 11 shown in FIG. 1 has a bottom 112 mounted on the placement surface 10 and a base cover 114 provided on the bottom 112.

The bottom 112 has a plate-like shape and a lower surface in contact with the placement part. Further, the first force detection unit 31 is mounted on the upper surface of the bottom 112.

The base cover 114 shown in FIG. 1 has a substantially rectangular parallelepiped outer shape. The outer shape of the base cover 114 is not limited to that, but may be e.g. a square shape, circular cylinder shape, or the like. The corner portion or edge portion may be chamfered or rounded. The interior of the base cover 114 is hollow.

The base cover 114 is partially divided and includes a main body 1141 and a lid body 1143 provided to close an opening part 1142 of the main body 1141. The lid body 1143 is detached, and thereby, the interior of the base cover 114 is opened via the opening part 1142. Therefore, work of housing boards or the like inside of the base cover 114 may be easily performed.

The first force detection unit 31, a power supply board 41, a control board 42, and a functional safety board 43 are housed inside of the base cover 114. Further, a structure e.g. a rack or rails for placement of the boards is provided inside of the base cover 114, and the power supply board 41, the control board 42, and the functional safety board 43 are supported by the structure. These boards are provided in positions in which the boards can be drawn outside from the opening part 1142, and repair and replacement work may be performed more easily. Preferably, the power supply board 41, the control board 42, and the functional safety board 43 are placed to overlap with one another. Thereby, the work may be performed more efficiently and the space may be saved.

Inside of the base cover 114, a first drive device 51 is further housed. The first drive device 51 generates drive power for pivoting the first arm 121 relative to the base 11.

Further, the base cover 114 has connectors 1151 and 1152 provided, for example, to be exposed in an outer surface 114*a* orthogonal to the Y-axis.

Of the connectors, to the connector 1151, a connector 1162 provided at one end of a cable 1161 is coupled. To the other end of the cable 1161, the teaching apparatus of tablet terminal type as a programming device is coupled.

To the connector 1152, a connector 1164 provided at one end of a cable 1163 is coupled. To the other end of the cable 1163, the second imaging unit 63 fixed outside of the robot 1, e.g., to a ceiling, wall, or the like is coupled.

Note that, in FIG. 1, the connectors 1151 and 1152 are provided in the outer surface 114*a* of the lid body 1143, however, the positions of the connectors 1151 and 1152 are not particularly limited. The connectors may be provided in other positions of the base cover 114 or an outer surface of the second arm 122.

The pipe 125 couples the base cover 114 and the second arm 122. One end of the pipe 125 is coupled to the base cover 114 and the other end is coupled to the second arm 122.

The above described base 11 supports the first arm 121. Note that the base 11 may directly support or indirectly support the first arm 121.

2. Movable Unit

As described above, the movable unit 12 shown in FIG. 1 has the first arm 121, the second arm 122, the actuation part 123, the hand 124, and the pipe 125.

The first arm 121 shown in FIG. 1 has a substantially rectangular parallelepiped outer shape. The outer shape of the first arm 121 is not limited to that, but, for example, the corner portion or edge portion of the rectangular parallelepiped may be chamfered or rounded.

The first arm 121 is provided pivotably about a first pivot axis AX1 relative to the base 11. The first pivot axis AX1 shown in FIG. 1 is provided in a position where one end portion of the long axis of the first arm 121 and the base 11 overlap and parallel to the Z-axis. The first arm 121 pivots about the first pivot axis AX1 by the drive power generated by the first drive device 51 provided inside of the above described base cover 114.

The second arm 122 shown in FIG. 1 has a substantially rectangular parallelepiped outer shape. The outer shape of the second arm 122 is not limited to that, but, for example, the corner portion or edge portion of the rectangular parallelepiped may be chamfered or rounded.

The second arm 122 is provided pivotably about a second pivot axis AX2 relative to the first arm 121. The second pivot axis AX2 shown in FIG. 1 is provided in a position where the other end portion of the long axis of the first arm 121 and one end portion of the second arm 122 in the Y-axis direction overlap and parallel to the Z-axis.

Further, a third pivot axis AX3 is provided in the other end portion of the second arm 122 in the Y-axis direction. The actuation part 123, which will be described later, is provided along the third pivot axis AX3.

The second arm 122 has an arm cover 126 having a hollow interior. The other end of the above described pipe 125 is coupled to the arm cover 126.

A second drive device 52 and a third drive device 53 are housed inside of the arm cover 126. The second drive device 52 generates drive power for pivoting the second arm 122 relative to the first arm 121. The third drive device 53 generates drive power for linearly moving and pivoting the actuation part 123 relative to the second arm 122.

Further, the arm cover 126 has connectors 1271 and 1272 provided to be exposed in an upper surface 126*a* thereof. A connector 1282 provided at one end of a cable 1281 is coupled to the connector 1271. Further, the first imaging unit 62 fixed to the outer surface of the arm cover 126 is coupled to the other end of the cable 1281. Note that, in FIG. 1, the connectors 1271 and 1272 are provided in the upper surface 126*a*, however, the positions of the connectors 1271 and 1272 are not particularly limited. The connectors may be provided in other positions of the second arm 122 or the outer surface of the base cover 114.

The actuation part 123 shown in FIG. 1 has a circular cylinder shape extending in directions parallel to the Z-axis and has a shaft 1231 having a spline groove and a ball spring groove (not shown) formed on a side surface thereof. The shaft 1231 penetrates the lower surface of the arm cover 126 and is inserted into the interior. Further, the actuation part 123 has a spline external cylinder 1232 and a ball screw nut 1233 provided inside of the arm cover 126, through which the shaft 1231 is inserted. Therefore, the actuation part 123 is actuated as the so-called ball screw spline. By the drive power generated by the third drive device 53, the shaft 1231 pivots about the third pivot axis AX3 and linearly moves in the upward and downward directions along the third pivot axis AX3.

Further, the shaft 1231 has a through hole 1231a penetrating the surface at the plus side and the surface at the minus side in the Z-axis direction. A cable or the like (not shown) can be inserted into the through hole 1231a as necessary.

Note that, in FIG. 1 and the respective drawings, for convenience of illustration, transmission of the drive power generated by the third drive device 53 to the ball screw nut 1233 is shown, however, drive power to be transmitted to the spline external cylinder 1232 may be generated in another drive device (not shown).

The hand 124 shown in FIG. 1 is provided in the lower end portion of the shaft 1231. The hand 124 is detachably provided to the shaft 1231. Thereby, the hand 124 may be replaced by various types of end effectors, e.g., a suction hand with a suction mechanism. Note that the hand 124 is provided as necessary.

One end of a cable 1291 is coupled to the hand 124. A connector 1292 is provided at the other end of the cable 1291. The connector 1292 is coupled to the connector 1272 provided in the upper surface 126a of the arm cover 126. Further, the cable 1291 is fixed to the outer surface of the arm cover 126 by a fixing bracket 1293. Note that, in FIG. 1, the cable 1291 is laid outside of the arm cover 126, however, may be inserted into the through hole 1231a of the shaft 1231.

For example, the second force detection unit 64 shown in FIG. 1 is provided on the upper surface of the hand 124. The second force detection unit 64 may detect a load applied to the hand 124 and capture the actuation status of the hand 124. The second force detection unit 64 includes e.g. a force sensor and pressure sensor.

The pipe 125 shown in FIG. 1 is an elongated tube. The pipe 125 preferably has flexibility and may protect a cable inserted through the pipe from vibration with pivot of the first arm 121 and the second arm 122 or the like. In the case of the robot 1 shown in FIG. 1, the cable inserted through the pipe includes a communication line and a power line coupling the base 11, the second arm 122, the actuation part 123, the hand 124, and the first imaging unit 62.

Note that, not all of the pipe 125 is necessarily have flexibility, but the pipe may partially have rigidity. The coupling portion between the pipe 125 and the base 11 and the coupling portion between the pipe 125 and the second arm 122 may be respectively pivotable relative to each other.

3. Drive Devices

The first drive device 51 has a drive control unit 512, a motor 514, and an encoder 516. The first drive device 51 is provided inside of the base 11.

The drive control unit 512 supplies electric power to the motor 514 and generates and outputs a motor control signal for controlling pivot of the motor 514 to the motor 514 according to a control signal output from the control board 42. Note that the electric power and the motor control signal output from the drive control unit 512 to the motor 514 may be the same signal as each other, i.e., a signal serving for both electric power supply and pivot control.

The pivot shaft of the motor 514 is coupled to the first arm 121. Thereby, the first arm 121 may be driven by the pivot of the motor 514.

The encoder 516 is actuated by the electric power supplied from the drive control unit 512, detects the pivot state of the motor 514, and outputs a detection result to the drive control unit 512. The detection result is output to the control board 42.

The second drive device 52 has a drive control unit 522, a motor 524, and an encoder 526. The second drive device 52 is provided inside of the second arm 122.

The drive control unit 522 supplies electric power to the motor 524 and generates and outputs a motor control signal for controlling pivot of the motor 524 to the motor 524 according to a control signal output from the control board 42. Note that the electric power and the motor control signal output from the drive control unit 522 to the motor 524 may be the same signal as each other, i.e., a signal serving for both electric power supply and pivot control.

The pivot shaft of the motor 524 is coupled to the second arm 122. Thereby, the second arm 122 may be driven by the pivot of the motor 524.

The encoder 526 is actuated by the electric power supplied from the drive control unit 522, detects the pivot state of the motor 524, and outputs a detection result to the drive control unit 522. The detection result is output to the control board 42.

The third drive device 53 has a drive control unit 532, a motor 534, and an encoder 536. The third drive device 53 is provided inside of the second arm 122.

The drive control unit 532 supplies electric power to the motor 534 and generates and outputs a motor control signal for controlling pivot of the motor 534 to the motor 534 according to a control signal output from the control board 42. Note that the electric power and the motor control signal output from the drive control unit 532 to the motor 534 may be the same signal as each other, i.e., a signal serving for both electric power supply and pivot control.

The pivot shaft of the motor 534 is coupled to the actuation part 123. Thereby, the actuation part 123 may be driven by the pivot of the motor 534.

The encoder 536 is actuated by the electric power supplied from the drive control unit 532, detects the pivot state of the motor 534, and outputs a detection result to the drive control unit 532. The detection result is output to the control board 42.

4. Control System

The robot 1 shown in FIGS. 1 and 2 further has the power supply board 41, the control board 42, and the functional safety board 43 as a control system. All of the boards are placed inside of the base 11. Note that, in FIG. 1, illustration of a part of the configuration is omitted.

4.1. Power Supply Board

The power supply board 41 receives an alternating-current voltage supplied from a power supply 9 provided outside of the robot 1, converts the voltage into a direct-current voltage, and generates a direct-current voltage signal or direct-current signal. The power supply board 41 outputs the generated signal to the control board 42 via a wire 420 and supplies electric power necessary for actuation of the control board 42.

For example, as shown in FIG. 3, the power supply board 41 is a board having a wiring board and various electronic components mounted thereon. Note that the power supply board 41 may have another form than the board, however, preferably has the board form in view of mountability on the base 11.

4.2. Functional Safety Board

The functional safety board 43 is coupled to the first force detection unit 31 via a wire 430. Thereby, from the first force detection unit 31, a signal necessary for actuation of the functional safety board 43, e.g. a force detection signal by the first force detection unit 31 is transmitted.

On the other hand, the functional safety board 43 is coupled to the first drive device 51 via a wire 431, coupled to the second drive device 52 via a wire 432, and coupled to the third drive device 53 via a wire 433. When detecting an abnormality of the first force detection unit 31, the functional safety board 43 outputs abnormality signals to the first drive device 51, the second drive device 52, and the third drive device 53. In the first drive device 51, the second drive device 52, and the third drive device 53 to which the abnormality signals are input, electric power supply to the respective motors is shut off. Thereby, the action of the movable unit 12 stops.

As described above, when an abnormality is recognized in the first force detection unit 31, the functional safety board 43 shuts off the electric power supply to stop the actuation of the movable unit 12. Thereby, during actuation of the robot 1, reliability of the force detection signal output from the first force detection unit 31 is secured and, for example, when the movable unit 12 of the robot 1 collides with an object or human, occurrence of the collision may be reliably detected. In other words, a situation that, despite a collision of the movable unit 12 against an object or human, the collision is undetectable may be prevented.

The above described stoppage of the actuation of the movable unit 12 may be performed according to a signal output from a processor 7 mounted on the control board 42. However, the processor 7 mounted on the control board 42 has processing capacity that tends to be lower due to an influence by heat, electromagnetic noise, or the like. On the other hand, the functional safety board 43 has the relatively simple function, and resistance to heat, electromagnetic noise, or the like is easily improved in the mounted processor. Accordingly, the reliability and safety of the robot 1 may be further improved because the actuation of the movable unit 12 may be stopped not via the control board 42.

Further, the functional safety board 43 is independently provided from the control board 42, and thereby, the control board 42 may be downsized by the size of the functional safety board, and thus, the base 11 housing the boards may also be downsized.

The wire 430 shown in FIG. 2 includes two wires 430a and 430b and is duplexed. The wires 430a and 430b are configured so that the same force detection signal may be output from the first force detection unit 31 to both of the wires. In the functional safety board 43, a difference between the force detection signals respectively output to the two wires 430a and 430b is monitored and, for example, when the difference exceeds a threshold value, an abnormality is determined. Thereby, in the functional safety board 43, health of the first force detection unit may be constantly monitored. That is, when an abnormality occurs inside of the first force detection unit 31, the difference between the force detection signals respectively output to the two wires 430a and 430b is larger. Therefore, whether or not an abnormality occurs in the first force detection unit 31 may be determined by detection of increase of the difference over the threshold value.

Note that the duplexing of the wire 430 is not essential, and may be omitted. Or, multiplexing of triplexing or more may be performed. The criterion of the determination as to whether or not an abnormality occurs is not limited to the criterion that the difference exceeds the threshold value, but may be another criterion.

It is preferable that the wires 431, 432, and 433 are respectively duplexed. Thereby, the abnormality signals may be transmitted more reliably and the functional safety may be further improved.

Note that the wires 432 and 433 are respectively inserted through the pipe 125 and routed from the base 11 to the second arm 122. Accordingly, damage on the wires 432 and 433 or the like may be suppressed and that contributes to higher functional safety.

For example, as shown in FIG. 3, the functional safety board 43 is a board having a wiring board and various electronic components mounted thereon. The electronic components include e.g. a processor such as an FPGA (Field-Programmable Gate Array), CPU, or ASIC (Application Specific Integrated Circuit), memory, interface, etc. A predetermined program stored in the memory is executed by the processor, and thereby, the above described control for functional safety is realized. Note that the functional safety board 43 may have another form than the board, however, preferably has the board form in view of mountability on the base 11.

4.3. Control Board

The control board 42 controls the respective actuation of the first drive device 51, the second drive device 52, and the third drive device 53 using the electric power supplied from the power supply board 41 and realizes work by the robot 1.

For example, as shown in FIG. 3, the control board 42 is a board having a wiring board and various electronic components mounted thereon. The electronic component includes the processor 7 shown in FIG. 3. The processor includes e.g. a CPU (Central Processing Unit). The other electronic components include e.g. a memory, interface, etc. A predetermined program stored in the memory is executed by the processor, and thereby, the above described control is realized. Note that the program may be externally downloaded via the interface. Further, the control board 42 may be connected to the Internet via a LAN (local area network) or the like. The control board 42 may have another form than the board, however, preferably has the board form in view of mountability on the base 11.

The control board 42 and the first drive device 51 are coupled via a wire 421. Further, the first drive device 51 and second drive device 52 and the second drive device 52 and third drive device 53 are coupled via a wire 422 inserted through the pipe 125 and a wire 423, respectively. Thereby, the control board 42, the first drive device 51, the second drive device 52, and the third drive device 53 are coupled to one another by bus wiring. From the control board 42, electric power and control signals necessary for the actuation of the first drive device 51, the second drive device 52, and the third drive device 53 are output. From the first drive device 51, the second drive device 52, and the third drive device 53, signals necessary for the actuation of the control board 42, e.g. signals by detection of the actuation statuses of the respective devices are transmitted. Note that the wiring form is not limited to that, but e.g. star wiring may be employed.

The control board 42 is coupled to the first force detection unit 31 via a wire 424. Thereby, from the control board 42, electric power and a control signal necessary for the actuation of the first force detection unit 31 are output. From the first force detection unit 31, a signal necessary for the actuation of the control board 42, e.g. the force detection signal by the first force detection unit 31 is transmitted.

Further, the control board 42 is coupled to the hand 124 via a wire 425 inserted through the pipe 125 and the above described cable 1291. Thereby, from the control board 42, electric power and a control signal necessary for the actuation of the hand 124 are output. From the hand 124, a signal necessary for the actuation of the control board 42, e.g. a signal by detection of the actuation status of the hand 124 is transmitted.

The control board 42 is coupled to the teaching apparatus 61 via a wire 426 and the above described cable 1161. Thereby, from the control board 42, electric power and a control signal necessary for the actuation of the teaching apparatus 61 are output. From the teaching apparatus 61, a signal necessary for the actuation of the control board 42, e.g. a program to be stored in the memory or the like is transmitted.

Further, the control board 42 is coupled to the first imaging unit 62 via a wire 427 inserted through the pipe 125 and the above described cable 1281. Thereby, from the control board 42, electric power and a control signal necessary for the actuation of the first imaging unit 62 are output. From the first imaging unit 62, a signal necessary for the actuation of the control board 42, e.g. image data captured by the first imaging unit 62 or the like is transmitted.

The control board 42 is coupled to the second imaging unit 63 via a wire 428 and the above described cable 1163. Thereby, from the control board 42, electric power and a control signal necessary for the actuation of the second imaging unit 63 are output. From the second imaging unit 63, a signal necessary for the actuation of the control board 42, e.g. image data captured by the second imaging unit 63 or the like is transmitted.

Further, the control board 42 is coupled to the second force detection unit 64 via a wire 429 inserted through the pipe 125. The wire 429 is further inserted through the through hole 1231a of the shaft 1231. Thereby, from the control board 42, electric power and a control signal necessary for the actuation of the second force detection unit 64 are output. From the second force detection unit 64, a signal necessary for the actuation of the control board 42, e.g. the force detection signal by the second force detection unit 64 is transmitted.

As described above, the control board 42 controls the respective actuation of the first drive device 51, the second drive device 52, and the third drive device 53 based on the signals transmitted from the first force detection unit 31, the hand 124, the teaching apparatus 61, and the first imaging unit 62.

Figure 4:
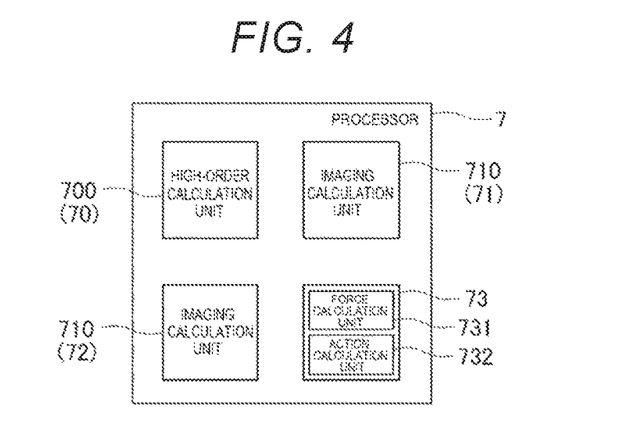
FIG. 4 is a functional block diagram showing a processor (calculating device) of a control board shown in FIG. 3.
Figure 5:
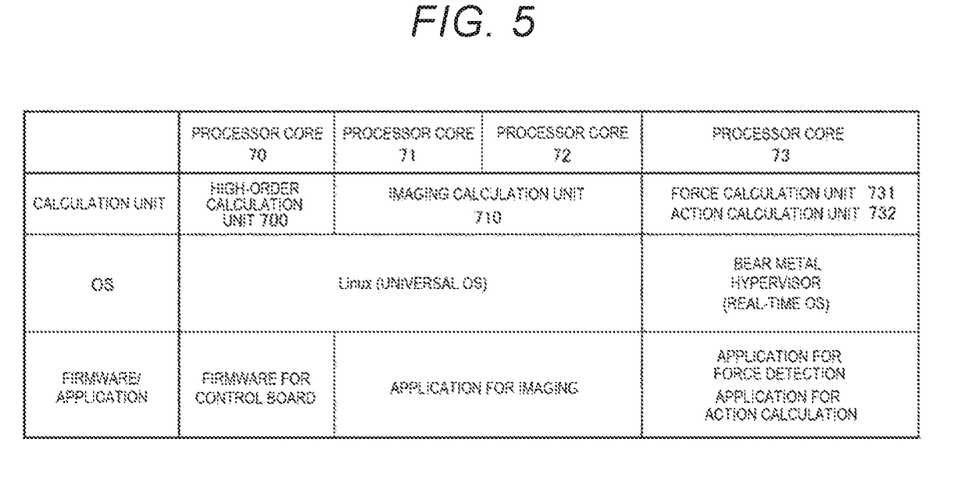
FIG. 5 is a table showing an example of relationships between OSes (Operating Systems) corresponding to respective processor cores of the processor shown in FIG. 4 and calculations processed by the respective processor cores.

Here, FIG. 4 is the functional block diagram showing the processor 7 (calculating device) of the control board 42 shown in FIG. 3. FIG. 5 is the table showing the example of relationships between OSes (Operating Systems) corresponding to respective processor cores 70 to 73 of the processor 7 shown in FIG. 4 and calculations processed by the respective processor cores 70 to 73.

The processor 7 shown in FIG. 4 is a multi-core CPU containing the four processor cores 70 to 73. The four processor cores 70 to 73 may process a plurality of calculations in parallel by assignment of different processing from one another. Thereby, the entire processing speed may be made higher.

As methods of using the multi-core CPU, there are symmetric multiprocessing (SMP) and asymmetric multiprocessing (AMP). It is preferable that the processor 7 is a CPU compliant to asymmetric multiprocessing. Thereby, the respective processor cores 70 to 73 may use different OSes from one another. For example, the processor uses e.g. both a universal OS and a real-time OS and is preferable as the processor 7 used for the robot 1.

Specifically, in the embodiment, the processor cores 70, 71, and 72 use universal OSes like Linux (registered trademark). A host OS hypervisor may be applied to the processor core 73, and preferably, a bear metal hypervisor is used. The bear metal hypervisor is software that directly operates on the processor core 73 without using a host OS and configures a virtualization environment. Thereby, the real-time OS may be used in the processor core 73. As a result, the single processor 7 is used and the universal OS and the real-time OS may be used in combination. Accordingly, downsizing and power saving of the robot 1 may be realized with the secured degree of freedom of design.

Different functions from one another are assigned to the respective processor cores 70 to 73 of the processor 7. That is, the processor 7 according to the embodiment has a high-order calculation unit 700 that performs a calculation for controlling the actuation of the control board 42, an imaging calculation unit 710 that calculates and processes the output from the first imaging unit 62, a force calculation unit 731 that calculates and processes the output from the first force detection unit 31, and an action calculation unit 732 that calculates and processes the action of the movable unit 12 based on the calculation result by the imaging calculation unit 710 and the calculation result by the force calculation unit 731 with respect to each function realized by calculation processing. The high-order calculation unit 700 is assigned to the processor core 70, the imaging calculation unit 710 is assigned to the processor cores 71, 72, and the force calculation unit 731 and the action calculation unit 732 are assigned to the processor core 73. As described above, the calculation processing is assigned to the different processor cores 70 to 73 with respect to each function, and thereby, processing may be performed in parallel to one another and the entire processing efficiency may be made higher.

Of the units, the high-order calculation unit 700 is a core in which firmware of the control board 42 is executed.

The imaging calculation unit 710 is a core in which application software for respectively calculating the output from the first imaging unit 62 provided in the movable unit 12 and the output from the second imaging unit provided outside of the robot 1, and outputting the calculation results to the action calculation unit 732 is executed. Specific calculation results include e.g. a position, posture, etc. of the object W obtained from the image data. The second imaging unit 63 may image the object W from outside of the robot 1, and thereby, for example, capture the object W moving closer to the robot 1, control the actuation of the robot 1 according to the distance, and shorten the takt time for the work. Note that, in this specification, both the first imaging unit 62 and the second imaging unit 63 are simply referred to as "imaging units". The imaging calculation unit 710 has a function of calculating the output from the imaging units.

The force calculation unit 731 is a core in which application software for respectively calculating the output from the first force detection unit 31 provided inside of the base 11 and the output from the second force detection unit 64 provided in the movable unit 12, and outputting the calculation results to the action calculation unit 732 is executed. Specific calculation results include e.g. a load application status on the base 11 obtained from the force detection signal and the actuation status of the hand 124. Note that the second force detection unit 64 may detect the actuation status of the hand 124, and thereby, the actions of the first arm 121 and the second arm 122 can be controlled according to the actuation status of the hand 124 using the calculation result.

In related art, the imaging calculation unit 710, the force calculation unit 731, and the action calculation unit 732 are provided outside of the processor 7 and provided outside of the base 11. Accordingly, there is a problem that laying of the cables coupling the respective units and the cables coupling the respective units and the control apparatus (controller) takes time and effort. On the other hand, in the embodiment, the imaging calculation unit 710, the force calculation unit 731, and the action calculation unit 732 are provided inside of the single processor 7. Accordingly, the cables coupling the imaging calculation unit 710, the force calculation unit 731, and the action calculation unit 732 are unnecessary and the installation work of the robot 1 is easier. Therefore, even an inexperienced user may easily install and use the robot 1.

Note that the above described respective calculation units refer to cores in which application software and firmware for realization of the respective functions are executed in the multi-core processor 7.

The order of the processor cores 70 to 73 is independent of the arrangement of cores within the processor 7. Therefore, the respective calculation units may be assigned to different cores from those described above.

Regarding the processor core 73, the bear metal hypervisor is used as described above, and thereby, two of the force calculation unit 731 and the action calculation unit 732 having different functions can be assigned to the single processor core 73 like the embodiment. That is, the virtualization environment is configured, and, even when the force calculation unit 731 and the action calculation unit 732 having different functions are assigned to the single processor core 73, the processing may be executed in parallel.

As described above, the robot 1 according to the embodiment includes the base 11, the movable unit 12 coupled to the base 11, and the control board 42 located inside of the base 11. Further, the control board 42 has the imaging calculation unit 710 that calculates the output from the first imaging unit 62, the force calculation unit 731 that calculates the output from the first force detection unit 31, and the action calculation unit 732 that calculates the action of the movable unit 12 based on the calculation result by the imaging calculation unit 710 and the calculation result by the force calculation unit 731.

According to the robot 1, laying work of the cables for coupling to the calculation units is unnecessary, and the installation work may be easily performed. Further, the imaging calculation unit 710, the force calculation unit 731, and the action calculation unit 732 are provided inside of the single processor 7, and thereby, the robot 1 may be downsized.

Furthermore, the control board 42 shown in FIG. 3 has a wiring board 42a and the processor 7 (calculating device) provided on the wiring board 42a. The processor 7 may be a device configured so that the calculation units process simultaneously in parallel in the virtualization environment configured in a single-core device, however, preferably includes a plurality of processor cores 70 to 73 (calculation cores). According to the control board 42 having the multi-core processor 7, the processing efficiency may be higher and driving of the robot 1 may be controlled with higher accuracy.

As described above, the processor 7 (calculating device) has the high-order calculation unit 700 that controls the actuation of the control board 42, the imaging calculation unit 710, the force calculation unit 731, and the action calculation unit 732. The high-order calculation unit 700 is assigned to the processor core 70, the imaging calculation unit 710 is assigned to the processor cores 71 and 72, and the force calculation unit 731 and the action calculation unit 732 are assigned to the processor core 73. Therefore, the number of cores to which the imaging calculation unit 710 corresponds is two and larger than any one of the number of cores to which the high-order calculation unit 700 corresponds, the number of cores to which the force calculation unit 731 corresponds, the number of cores to which the action calculation unit 732 corresponds.

The numbers of cores are assigned as described above, and thereby, the more resource of the processor 7 may be assigned to the imaging calculation unit 710 having larger processing capacity. Therefore, the processing of the imaging calculation unit 710 is harder to be a bottleneck in the processing speed, and lowering of the entire processing efficiency may be suppressed.

Note that the number of cores to which the imaging calculation unit 710 corresponds is not limited to two, but may be one, three, or more. The numbers of cores to which the high-order calculation unit 700, the force calculation unit 731, and the action calculation unit 732 respectively correspond may be two or more.

The number of cores contained in the processor 7 may be two, three, five, or more.

The action calculation unit 732 is configured to stop or decelerate the action of the movable unit 12 based on the calculation result by the force calculation unit 731. For example, when the force detection signal due to contact of the movable unit 12 with an object or the like in the first force detection unit 31 is transmitted to the control board 42, the force detection signal is calculated and processed in the force calculation unit 731. Then, the action calculation unit 732 performs a calculation for stopping or decelerating the action of the movable unit 12 based on the calculation result. The calculation result, i.e., the control signal for controlling the action of the movable unit 12 is output to the first drive device 51, the second drive device 52, and the third drive device 53, and thereby, the action of the movable unit 12 may be safely controlled.

5. First Force Detection Unit

The robot 1 shown in FIGS. 1 and 2 has the first force detection unit 31. The first force detection unit 31 is located inside of the base 11 as described above.

With the first force detection unit 31 located inside of the base 11, the robot 1 may detect contact between the whole movable unit 12 and an object or human. That is, when the first force detection unit 31 is provided in e.g. the second arm 122, the detection is limited to detection of contact of an object or human with the second arm 122, however, the first force detection unit 31 is provided inside of the base 11, and thereby, the detection can be performed in the whole movable unit 12 as described above. Accordingly, safety of the robot 1 may be further improved.

The first force detection unit 31 includes e.g. a three- or six-axis force sensor. Note that the first force detection unit 31 is not limited to the one provided inside of the base 11, but includes e.g. a force sensor provided outside of the robot 1. However, the unit is provided inside, and thereby, the above described effects may be obtained more reliably.

6. Wires

The robot 1 includes the wire 424 (first wire) provided inside of the base 11 and coupling the first force detection unit 31 and the control board 42. Thereby, outside of the robot 1, at least the laying work of the cables coupling the first force detection unit 31 and the control board 42 or the like is unnecessary. Accordingly, the robot 1 for which the installation work is easier may be realized.

As described above, the robot 1 according to the embodiment further includes the functional safety board 43 (functional safety unit) provided inside of the base 11 and detecting an abnormality of the first force detection unit 31 based on the output from the first force detection unit 31.

The robot 1 also includes the wire 430 (second wire) coupling the first force detection unit 31 and the functional safety board 43.

The functional safety board 43 is provided, and thereby, health of the first force detection unit 31 may be secured. Therefore, a situation that, despite a collision of the movable unit 12 against an object or human, the collision is undetectable may be prevented.

In the robot 1 according to the embodiment, as described above, the wire 430 coupling the first force detection unit 31 and the functional safety board 43 is duplexed. Further, the functional safety board 43 is configured to detect the abnormality of the first force detection unit 31 based on the difference between the signal output from the first force detection unit 31 via the one wire 430a and the signal output via the other wire 430b.

According to the robot 1, the health of the first force detection unit 31 may be constantly monitored, and thereby, measures to stop the actuation of the movable unit 12 promptly when an abnormality occurs may be taken.

Further, the movable unit 12 of the robot 1 according to the embodiment has the first arm 121 and the second arm 122 that pivots relative to the first arm 121, and the robot 1 includes the pipe 125 coupling the base 11 and the second arm 122 and the wire 427 (third wire) coupling the first imaging unit 62 and the control board 42 and inserted through the pipe 125.

In the robot 1, the work of routing the wire 427 outside of the base cover 114 and coupling the wire to the control board 42 is unnecessary. That is, the wire 427 is laid inside of the base 11 and inside of the second arm 122 in advance and it is only necessary to couple the cable 1281 and the wire 427 when the first imaging unit 62 is placed. Accordingly, the placement work may be simplified.

The movable unit 12 of the robot 1 according to the embodiment includes the wire 425 (fourth wire) coupling the hand 124 as the end effector and the control board 42 and inserted through the pipe 125.

In the robot 1, the work of routing the wire 425 outside of the base cover 114 and coupling the wire to the control board 42 is unnecessary. That is, the wire 425 is laid inside of the base 11 and inside of the second arm 122 in advance and it is only necessary to couple the cable 1291 and the wire 425 when the hand 124 is placed. Accordingly, the placement work may be simplified.

As above, the robot according to the present disclosure is explained with reference to the illustrated embodiments, however, the present disclosure is not limited to those. The configurations of the respective parts may be replaced by arbitrary configurations having the same functions. Further, another arbitrary configuration may be added to the above described embodiments. Furthermore, in the above described embodiments, the imaging calculation unit, the force calculation unit, and the action calculation unit are provided in the same processor, however, the present disclosure is not limited to those. The units may be e.g. processors mounted on the same board.

What is claimed is:

1. A robot comprising:
a base having an inner space therein;
an arm coupled to the base;
a camera configured to take an image of an object and output a first signal corresponding to the image;
a first force sensor configured to detect an external force applied to the robot and output a second signal corresponding to the detected external force, the first force sensor being located in the inner space of the base;
a power supply board configured to receive a voltage supplied from a power supply, the power supply board being located in the inner space of the base; and
a control board configured to receive the voltage from the power board, the control board being located in the inner space of the base, the control board having a memory and a processor, the memory being configured to store a program, the processor being configured to execute the program so as to:
receive the first signal from the camera;
receive the second signal from the first force sensor; and
calculate an action of the arm based on the first and second signals.

2. The robot according to claim 1, wherein
the control board has a wiring board on which the processor is provided, and
the processor includes a plurality of calculation cores.

3. The robot according to claim 2, wherein
the processor has a high-order calculation portion that controls actuation of the control board, processing of the first and second signals, and the calculation of the action of the arm, and
a number of the plurality of calculation cores corresponding to processing of the first signal is larger than any one of a number of the plurality of calculation cores corresponding to the high-order calculation portion, a number of the plurality of calculation cores corresponding to processing of the second signal, and a number of the plurality of calculation cores corresponding to the calculation of the action of the arm.

4. The robot according to claim 1, wherein
the processor is configured to stop or decelerate the action of the arm based on the second signal.

5. The robot according to claim 4, further comprising a first wire provided in the inner space of the base and coupling the first force sensor and the control board.

6. The robot according to claim 1, wherein
the processor is configured to calculate the action of the arm further based on a third signal from a second force sensor provided in the arm.

7. The robot according to claim 1, further comprising:
a functional safety board provided in the inner space of the base and detecting an abnormality of the first force sensor based on the second signal from the first force sensor; and
a second wire coupling the first force sensor and the functional safety board.

8. The robot according to claim 7, wherein
the second wire is duplexed and is configured with a first sub-wire and a second sub-wire, and
the functional safety board detects the abnormality based on a difference between a signal from the first sub-wire of the second wire and a signal from the second sub-wire of the second wire.

9. The robot according to claim 1, further comprising:
another arm rotatably connected to the arm;
a pipe coupling between the base and the another arm; and
a third wire coupling between the camera and the control board and extending through an inside of the pipe.

10. The robot according to claim 9, further comprising:
a fourth wire coupling between an end effector and the control board and extending through the inside of the pipe,
wherein the end effector is connected to the arm.

* * * * *